United States Patent
Ramamonjison et al.

(10) Patent No.: US 12,001,779 B2
(45) Date of Patent: Jun. 4, 2024

(54) METHOD AND SYSTEM FOR AUTOMATICALLY FORMULATING AN OPTIMIZATION PROBLEM USING MACHINE LEARNING

(71) Applicants: Rindranirina Ramamonjison, Burnaby (CA); Amin Banitalebi Dehkordi, Vancouver (CA); Vishnu Gokul Rengan, Burnaby (CA); Zirui Zhou, Surrey (CA); Yong Zhang, Richmond (CA)

(72) Inventors: Rindranirina Ramamonjison, Burnaby (CA); Amin Banitalebi Dehkordi, Vancouver (CA); Vishnu Gokul Rengan, Burnaby (CA); Zirui Zhou, Surrey (CA); Yong Zhang, Richmond (CA)

(73) Assignee: HUAWEI CLOUD COMPUTING TECHNOLOGIES CO., LTD., Gui'An New District (CN)

( * ) Notice: Subject to any disclaimer, the term of this patent is extended or adjusted under 35 U.S.C. 154(b) by 58 days.

(21) Appl. No.: 17/576,843

(22) Filed: Jan. 14, 2022

(65) Prior Publication Data
US 2023/0229849 A1   Jul. 20, 2023

(51) Int. Cl.
*G06F 40/143* (2020.01)
*G06F 40/20* (2020.01)
*G06N 20/20* (2019.01)

(52) U.S. Cl.
CPC ............ *G06F 40/143* (2020.01); *G06F 40/20* (2020.01); *G06N 20/20* (2019.01)

(58) Field of Classification Search
CPC ...... G06F 40/143; G06F 40/20; G06F 40/216; G06F 40/284; G06F 40/295; G06F 40/40; G06N 20/20; G06N 20/00; G06N 5/01
See application file for complete search history.

(56) References Cited

U.S. PATENT DOCUMENTS

| | | | |
|---|---|---|---|
| 6,772,136 B2 * | 8/2004 | Kant .................. | G06F 17/13 706/50 |
| 2009/0077001 A1 * | 3/2009 | Macready ............ | G06N 5/02 706/57 |

(Continued)

FOREIGN PATENT DOCUMENTS

| | | | | |
|---|---|---|---|---|
| CA | 3079066 A1 * | 12/2020 | ............. | G06N 20/00 |
| WO | WO-2020246073 A1 * | 12/2020 | ............. | G06F 17/11 |

OTHER PUBLICATIONS

Wang et al., "A Computer-based Feed Formulation Data Optimization Processing System And Method", published on Feb. 7, 2020, CN 110765603A, pp. 10 (Year: 2020).*

(Continued)

*Primary Examiner* — Chau T Nguyen

(57) ABSTRACT

The present disclosure provides a computer implemented method and system for generating an algebraic modelling language (AML) formulation of natural language text description of an optimization problem. The computer implemented method includes generating, based on the natural language text description, a text markup language intermediate representation (IR) of the optimization problem, the text markup language IR including an IR objective declaration that defines an objective for the optimization problem and a first IR constraint declaration that indicates a first constraint for the optimization problem. The computer implemented also includes generating, based on the text markup language IR, the AML formulation of the optimization problem, the AML formulation including an AML objective declaration that defines the objective for the optimization problem and a first AML constraint declaration that indicates the first constraint for the optimization problem. The computer implemented method and system of the present disclosure improves the accuracy in generating an AML formation of an optimization problem than is possible (Continued)

with known solutions, thereby improving the operation of a computer system that applies the computer implemented method.

20 Claims, 15 Drawing Sheets

(56) References Cited

U.S. PATENT DOCUMENTS

| | | | | |
|---|---|---|---|---|
| 2011/0184706 | A1* | 7/2011 | Iwane | G06F 17/11 703/2 |
| 2018/0107940 | A1* | 4/2018 | Lieberman | G06N 20/00 |
| 2018/0293211 | A1* | 10/2018 | Pregasen | G06F 40/143 |
| 2020/0401650 | A1* | 12/2020 | Chen | G06F 17/16 |
| 2021/0303915 | A1* | 9/2021 | Mandal | G06N 20/00 |
| 2022/0114464 | A1* | 4/2022 | Yang | G06N 20/00 |
| 2023/0186145 | A1* | 6/2023 | Marinescu | G06N 20/00 704/9 |

OTHER PUBLICATIONS

T. Huerlimann "Modeling and Optimization" Kluwer Academic Publishers 1999.
A. Brooke et al., "High level modeling systems and nonlinear programming," in Numerical Optimization, Philadelphia, SIAM 1984.
J. Bisschop, "On the development of the general algebraic modeling system in a strategic planning environment," Mathematical Programming Study, vol. 20, pp. 1-29 1982.
P. Piela et al., "Ascend: an object-oriented computer environment for modeling and analysis: The modeling language," Computers and Chemical Engineering, vol. 15, pp. 53-72 1991.
J. Jaffar et al. "Constraint logic programming: A survey," Journal of Logic Programming, vol. 19/20, pp. 503-581 1994.
C. Jones, "Visualization and Optimization", Boston: Kluwer Academic Publishers 1996.
J. Zelle et al. Learning to Parse Database Queries Using Inductive Logic Programming *AAAI/IAAI, vol. 2* 1996.
Y. W. Wong et al. "Learning for Semantic Parsing with Statistical Machine Translation". * NAACL* 2006.
J. Andreas et al. "Semantic Parsing as Machine Translation". *ACL* 2013.
D. Zhang et al. "The Gap of Semantic Parsing: A Survey on Automatic Math Word Problem Solvers." *IEEE Transactions on Pattern Analysis and Machine Intelligence* 42 2020.
L. Zhou et al. "Learn to Solve Algebra Word Problems Using Quadratic Programming." *EMNLP*. 2015.
Y. Wang et al. "Deep Neural Solver for Math Word Problems." *EMNLP* 2017.
Z. Liang et al. "MWP-BERT: A Strong Baseline for Math Word Problems." *ArXiv, abs/2107.13435* 2021.
Lewis, M et al., "BART: Denoising Sequence-to-Sequence Pre-training for Natural Language Generation, Translation, and Comprehension", In Proceedings of the 58th Annual Meeting of the Association for Computational Linguistics, pp. 7871-7880, Online. Association for Computational Linguistics 2020.
C. Raffel et al., "Exploring the limits of transfer learning with a unified text-to-text transformer". Journal of Machine Learning Research, 21(140):1-67. 2020.
A. Radford et al. "Improving Language Understanding by Generative Pre-Training." 2018.
T. Brown, et al,. "Language Models are Few-Shot Learners." 2020.

* cited by examiner

IR 211

402

```
<DECLARATION>
[<OBJ_DIR> maximize </OBJ_DIR>][<OBJ_NAME> average performance </OBJ_NAME>] [is]
[<VAR> REIT fund </VAR> [times] <PARAM> 7.3% </PARAM> [plus]
<VAR> dividend ETF </VAR> [times] <PARAM> 10.2% </PARAM>]
</DECLARATION>
```

404

```
<DECLARATION>
[<CONST_DIR> total </CONST_DIR><LIMIT> $15000 </LIMIT>]
[<CONST_TYPE> [SUM_CONSTRAINT] </CONST_TYPE>]
</DECLARATION>
```

406

```
<DECLARATION>
<CONST_DIR> at most </CONST_DIR><LIMIT> 40%</LIMIT>
<CONST_TYPE> [RATIO_CONSTRAINT] </CONST_TYPE> [for]
<VAR> REIT fund </VAR>
</DECLARATION>
```

408

```
<DECLARATION>
<CONST_DIR> minimum </CONST_DIR><LIMIT> 30%</LIMIT>
<CONST_TYPE> [RATIO_CONSTRAINT] </CONST_TYPE> [for]
<VAR> dividend ETF </VAR>
</DECLARATION>
```

FIG. 4

NL OPD 166

Cautious Asset investment has a [total] of [$150000] to manage and decides to invest it in an [REIT fund], which yields an [average return] of [7.3%] as well as in a [dividend ETF], which gives an [average return] of [10.2%]. To reduce the investment risk, CAI's policy requires it to diversify the asset allocation so that [at most 40%] of the investment can be allocated to [real-estate]. To achieve its investors' goal to have steady monthly income, a [minimum of 30%] of their assets must also be invested in [dividend ETF]. CAI wants to [maximize] its [average performance]. Formulate the optimization problem.

```
Receive a natural language text description of an optimization problem
1402
```

```
Generating, based on the natural language text description, a text markup language
intermediate representation (IR) of the optimization problem, the text markup language
IR including an IR objective declaration that defines an objective for the optimization
problem and a first IR constraint declaration that indicates a first constraint for the
optimization problem
1404
```

```
Generating, based on the text markup language IR, an algebraic modelling language
(AML) formulation of the optimization problem, the AML formulation including an
AML objective declaration that defines the objective for the optimization problem and
a first AML constraint declaration that indicates the first constraint for the optimization
problem.
1406
```

FIG. 14

METHOD AND SYSTEM FOR AUTOMATICALLY FORMULATING AN OPTIMIZATION PROBLEM USING MACHINE LEARNING

FIELD

This disclosure relates to method and systems for automatically formulating optimization problems using machine learning.

BACKGROUND

Many real-world problems that require decisions to be made can be formulated and solved as optimization problems. Optimization problems can be applied to assist decision making in many different application domains such as engineering, management, chemistry, finance, transportation, and other areas. An optimization problem is the problem of finding the best solution from all feasible solutions. Once formulated, an optimization problem can be solved using an optimization solver. For example, an optimization problem may be a linear programming (LP), mixed-integer programming, combinatorial, or convex optimization problem, and the optimization problem can be represented using modeling languages and the optimization problem can be efficiently solved by existing optimization solvers that run standard algorithms to solve them.

A formulation of an optimization problem ("optimization problem formulation") typically includes decision variables, an objective optimization function (for example, a function that is either maximized or minimized), constraints, and parameters. The parameters can include objective parameters, constraint parameters and constraint limit parameters. By way of example, a standard formulation of a linear programming (LP) optimization problem can be algebraically represented as:

$$\min_{x \in R^n} c^\top x \text{ s.t. } a_i^\top x \le b_i, i = 1, \ldots, m$$

Where the formulation includes the following entities:

$$\min_{x \in R^n} c^\top x$$

is a linerar objective function, $a_i^T x \le b_i$ is a set of m linear constraints, $x = (x_1, x_2, \ldots, x_n)^T$ are continuous decision variables, $c = (c_1, c_2, \ldots, c_n)^T$ are parameters for the objective, $a_i = (a_{i1}, a_{i2}, \ldots, a_{in})^T$ are parameters for the i-th constraint, and $b = (b_1, b_2, \ldots, b_m)^T$ are parameters for the constraint limits.

The process of formulating a real-world problem as a corresponding optimization problem formulation in a modelling language that is understood by an optimization solver requires both domain expertise and optimization expertise. Domain expertise is needed to understand the real-world problem to ensure that a relevant set of parameters is collected and to ensure that it is clear what decision variables need to be optimized, what the optimization constraints are, and what the objective optimization function is. Expertise in formulating optimization problems is required to translate the real-world problem into a suitable optimization problem formulation and represent the optimization problem formulation in a modeling language that an optimization solver understands.

The process of formulating an optimization problem is most successful when the real-world problem is clearly understood, the optimization problem formulation (e.g., decision variables, objective function, constraints and parameters) is correctly identified, and the optimization problem formulation is accurately written in a modeling language. However, domain expertise and expertise in the formulating of optimization problems are often the skills of different individuals (e.g., a domain expert and an expert such as a optimization research consultant, respectively), resulting in a gap between the language of the domain expert and the language of modelling expert, which can provide an obstacle to the process of formulating an optimization problem, and in particular to clearly formulating the optimization problem formulation (e.g., decision variables, objective function, and constraints) and to correct identification of the parameters.

Accordingly, there is a need for computer implemented solutions that can assist with the conversion of a real-world problem, which may for example be expressed using a natural language description, into an optimization problem formulation in a modeling language that can be understood by a computer-implemented optimization solver. There is further need for such a system that can be applied by users who are not experts in formulating and solving optimization problems.

SUMMARY

According to a first example aspect of the disclosure is a computer implemented method for processing a natural language text description of an optimization problem. The computer implemented method includes generating, based on the natural language text description, a text markup language intermediate representation (IR) of the optimization problem, the text markup language IR including an IR objective declaration that defines an objective for the optimization problem and a first IR constraint declaration that indicates a first constraint for the optimization problem and generating, based on the text markup language IR, an algebraic modelling language (AML) formulation of the optimization problem. The AML formulation including an AML objective declaration that defines the objective for the optimization problem and a first AML constraint declaration that indicates the first constraint for the optimization problem.

In at least some scenarios, the use of a two stage process whereby the natural language text description is first mapped to a text markup language that is then mapped to an AML formulation can provide improved accuracy in generating an AML formation of an optimization problem than is possible with known solutions, thereby improving the operation of a computer system that applies the computer implemented method.

In some examples, the text markup language IR may include one or more further constraint declarations each indicating a respective further constraint for the optimization problem, and the AML formulation may include one or more further AML constraint declarations indicating the respective further constraints.

In some examples of the computer implemented method, the method computer implemented includes mapping the AML formulation to a solver language representation of the optimization problem, and providing the solver language representation to an optimization solver to output a solution for the optimization problem.

In some example of the computer implemented method, generating the text markup language IR comprises: generating, based on the text markup language IR, an objective declaration prompt that includes information about the objective for the optimization problem and a first constraint declaration prompt that includes information about the first constraint for the optimization problem; providing the objective declaration prompt and the natural language text description to a transformer to generate the IR objective declaration; and providing the first constraint declaration prompt and the natural language text description to the transformer to generate the first IR constraint declaration.

In some examples of the computer implemented method, the generating the objective declaration prompt and the first constraint declaration prompt comprises: recognizing, using a first trained machine leaning model, declaration entities included in the natural language text description that correspond to a set of pre-defined type categories; identifying, using a second trained machine leaning model, recognized declaration entities that are co-references; and assembling the objective declaration prompt and the first constraint declaration prompt based on the recognized declaration entities and the identified co-references.

In some examples of the computer implemented method, the computer implemented method includes prior to providing the objective declaration prompt to the transformer, communicating the objective declaration prompt to a user input/output module to enable a user to approve or modify the objective declaration prompt; and prior to providing the first constrain declaration prompt to the transformer, communicating the first constrain declaration prompt to the user input/output module to enable the user to approve or modify the first constrain declaration prompt.

In some examples of computer implemented, the IR objective declaration and IR constraint declaration are each generated using a machine learning based transformer that receives the natural language text description as an input, and the method includes training the transformer to extract and copy selected entities from the natural language text description into one or both of the IR objective declaration and the first IR constraint declaration.

In some examples of the computer implemented, the computer implemented method includes performing an objective declaration validation check of the IR objective declaration by inputting the natural language text description and the IR objective declaration to a machine learning model that is trained to predict if an input IR declaration includes an error; performing a constraint declaration validation check of the first IR constraint declaration by inputting the natural language text description and the first IR constraint declaration to the machine learning model; and communicating results of the objective declaration validation check and the constraint declaration validation check to a user input/output module for presentation to a user.

In some examples of the computer implemented, the method computer implemented includes augmenting a training dataset for training the machine learning model by generating a set of erroneous IR declarations for a respective training example of a natural language text description of an training example optimization problem by perturbing entities included in a ground truth IR declaration respective training example of the natural language text description.

In some examples of the computer implemented method, the computer implemented method includes performing an objective declaration validation check of the AML objective declaration by inputting the IR objective declaration and the AML objective declaration to a machine learning model that is trained to predict if an input AML declaration includes an error; performing a constraint declaration validation check of the first AML constraint declaration by inputting the first IR constraint declaration and the first AML constraint declaration to the machine learning model; and communicating results of the objective declaration validation check and the constraint declaration validation check to a user input/output module for presentation to a user.

According to a further example aspect is a system comprising one or more processors, and one or more memories storing executable instructions that when executed by the one or more processors cause the system to perform the method according to any one of the preceding examples.

According to a further example aspect is a non-transitory computer readable medium storing computer executable instructions for execution by the one or more processors to perform the method according to any one of the preceding examples.

BRIEF DESCRIPTION OF THE DRAWINGS

Reference will now be made, by way of example, to the accompanying drawings which show example embodiments of the present disclosure, and in which:

FIG. 4 shows an intermediate representation (IR) of a set of optimization problem declarations generated by a text to IR mapper of the NL text to AML formulation mapper;

FIG. 5 shows an example of the NL OPD of FIG. 2 with highlighted problem entities;

FIG. 14 is a flow diagram of a method performed by the NL text to AML formulation mapper.

DESCRIPTION OF EXAMPLE EMBODIMENTS

Example embodiments of systems, computer implemented methods and computer program products for mapping a natural language (NL) text description of an optimization problem to a corresponding algebraic modelling language (AML) formulation of the optimization problem are presented in this disclosure. Once generated, the AML formulation can be mapped to a solver language representation of the optimization problem that can be solved by an optimization solver.

Figure 1:
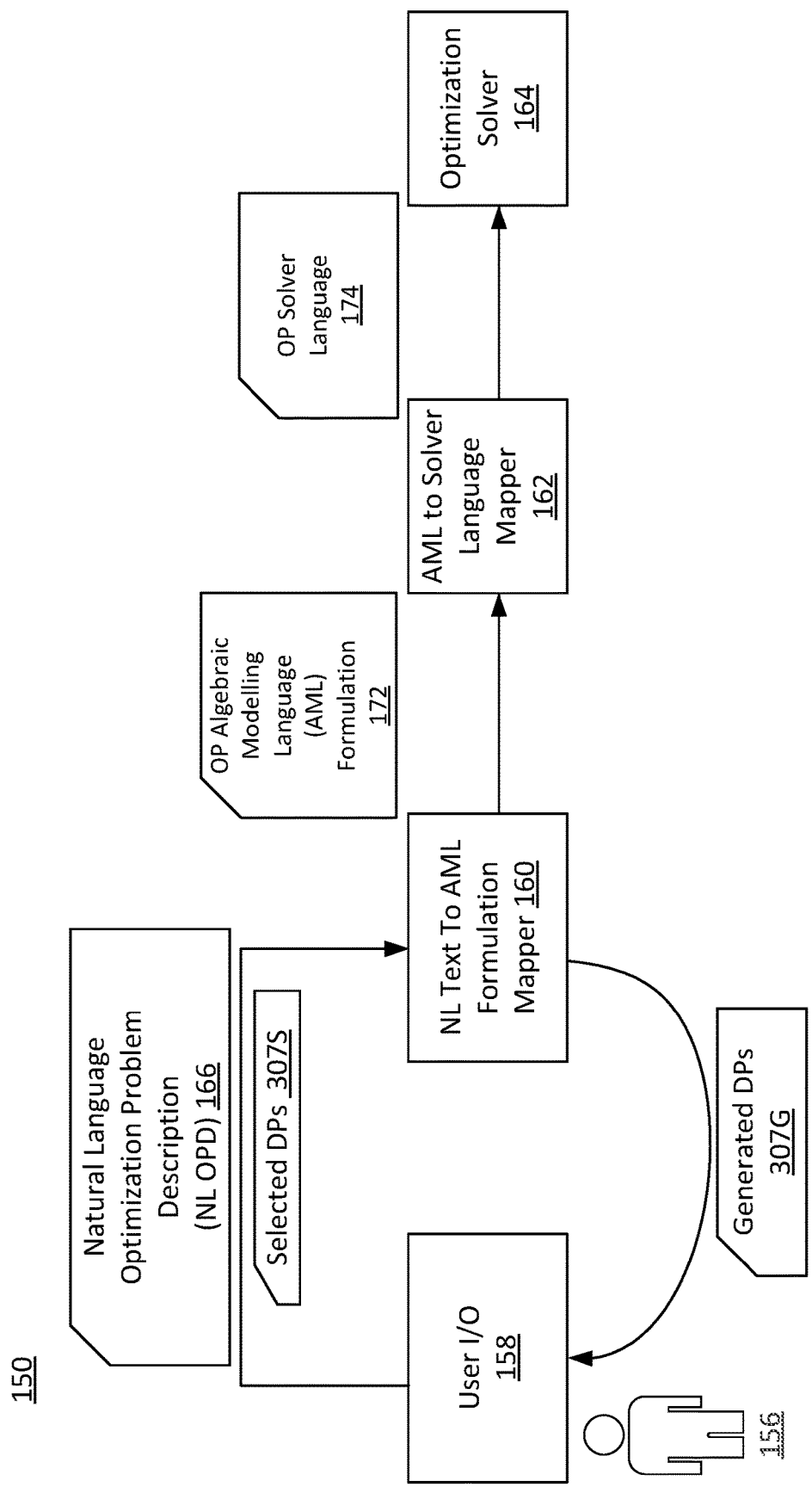
FIG. 1 is a block diagram illustrating a system for formulating a natural language description of an optimization problem as a corresponding optimization algorithm in a modelling language understood by an optimization solver, according to an example aspect of the disclosure.

FIG. 1 illustrates, according to example aspects of the disclosure, a computer implemented system 150 that enables a natural language optimization problem description (NL OPD) 166 provided by a user 156 (for example an expert in the subject matter domain for which an optimization problem solution is desired, or an expert in formulating optimization problems) to be formulated into an optimization problem (OP) solver language 174 that can be provided to an optimization solver 164.

As illustrated in FIG. 1, the system 150 includes a plurality of modules, including: a user I/O 150, a natural language (NL) text to algorithmic modelling language (AML) formulation mapper 160, an AML to solver language mapper 162, and an optimization solver 164. Each of these modules will be described below. As used here, "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit. In some examples, multiple modules may be implemented using a common hardware processing circuit. Modules themselves can comprise one or more components that are themselves modules (e.g., sub-modules).

User I/O 158 can comprise one or more user interface (UI) components that enable a user 156 to interact with AML modelling interface 160 and other modules of the system 150. For example, User I/O 158 can include an audio sensor and a speech-to-text conversion module that can use known solutions to convert natural language speech that is spoken by a user into computer readable natural language text, enabling user to verbally input NL OPD 166. User I/O 158 may also (or alternatively) include a keyboard or other input device and a display interface that enables user 156 to directly input, edit, and/or view the text of NL OPD 166. In addition to enabling input of text for NL OPD 166, User I/O 158 can also enable user 156 to receive information from, and provide further inputs to, the NL text to AML formulation mapper 160, as will be described in greater detail below.

Figure 2:
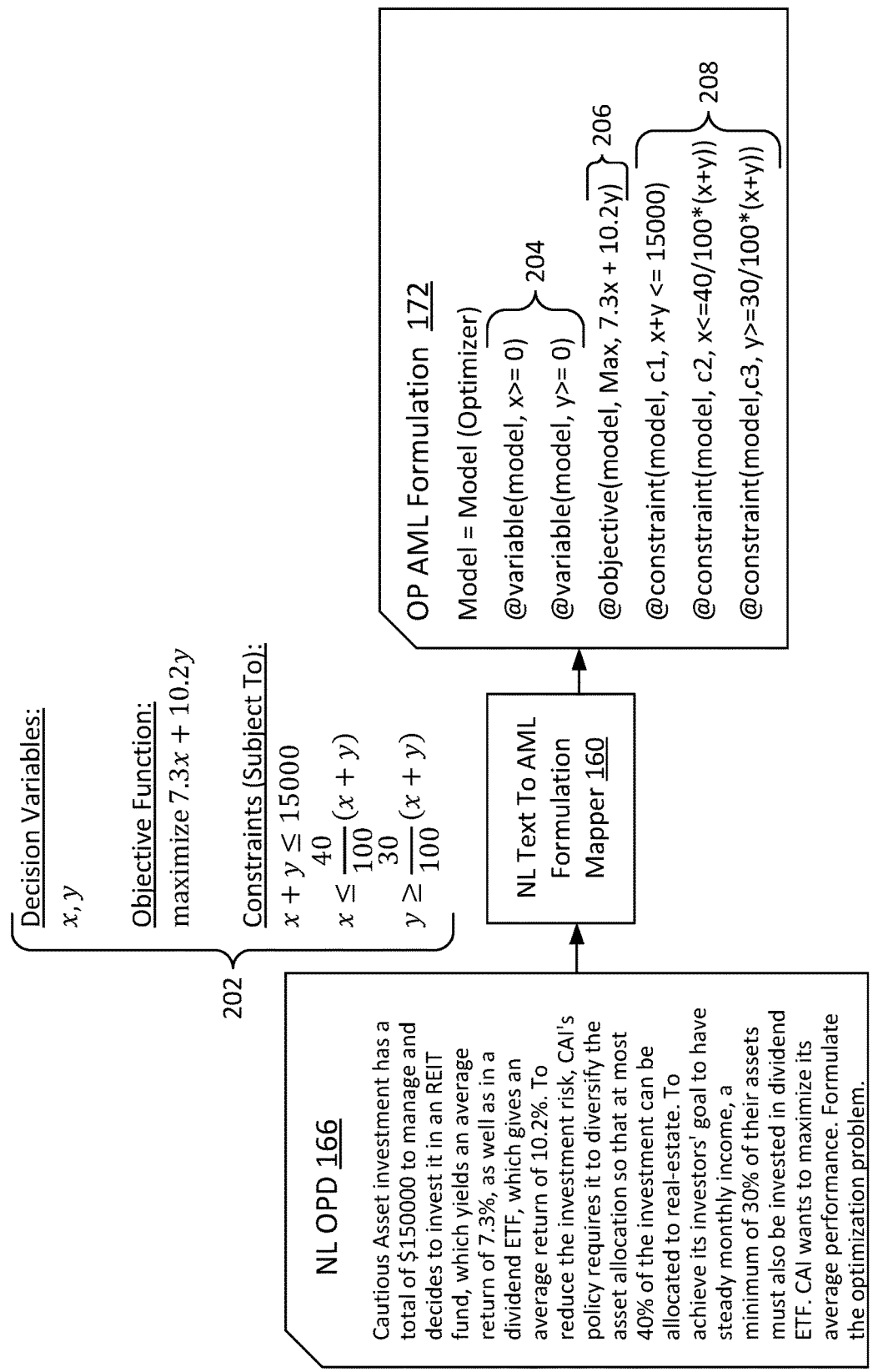
FIG. 2 shows an illustrative example of mapping of a natural language optimization problem description (NL OPD) to an algebraic modelling language (AML) formulation of the optimization problem using a natural language (NL) text to AML formulation mapper of the system of FIG. 1.

NL text to AML formulation mapper 160 is configured to map the NL OPD 166 to an OP algorithmic modelling language (AML) formulation 172. For contextual purposes, an illustrative example of an NL text to AML formulation mapping for a specific LP optimization problem is shown in FIG. 2. It will be noted that the illustrated NL OPD 166 includes a natural language text description of an optimization problem that will be referenced throughout this disclosure to describe embodiments, namely:

"Cautious Asset investment has a total of $150000 to manage and decides to invest it in an REIT fund, which yields an average return of 7.3%, as well as in a dividend ETF, which gives an average return of 10.2%. To reduce the investment risk, CAI's policy requires it to diversify the asset allocation so that at most 40% of the investment can be allocated to real-estate. To achieve its investors' goal to have steady monthly income, a minimum of 30% of their assets must also be invested in dividend ETF. CAI wants to maximize its average performance. Formulate the optimization problem."

Although the above optimization problem example illustrates a linear programming (LP) optimization problem in the financial domain, the methods and systems for automatically formulating an optimization problem using machine learning described in this disclosure can be applied across many different real-world application domains such as engineering, management, chemistry, manufacturing, transportation, agriculture and other areas. This disclosure presents a technical and concrete solution for configuring a computer system to provide a system and enable methods that can efficiently and accurately automatically formulate optimization problems.

As will be apparent from FIG. 2, the text of illustrated NL OPD 166 includes a sequence of text entities (each of which can include one or more discrete words or "tokens") that describe an optimization problem using natural language. The illustrated NL OPD 166 can be algebraically represented by the mathematical algebraic optimization problem formulation 202:

Decision Variables: x, y
Objective Function: maximize 7.3x+10.2y
Constraints (Subject To):

$$x + y \le 15000$$

$$x \le \frac{40}{100}(x+y)$$

$$y \ge \frac{30}{100}(x+y)$$

Where:
Decision variable x denotes amount to invest in a REIT;
Decision variable y denotes amount to invest in a dividend ETF;
"maximize" is an objective direction, and 7.3 and 10.2 are objective parameters;
"$\ge$," and "$\le$" are constraint directions and "15000", "30/100" and "40/100" are constraint parameters.

The resulting OP AML formulation 172, as shown in FIG. 2, is an AML representation of the optimization problem described in the text of NL OPD 166. OP AML formulation 172 includes syntax that declares entities of the optimization problem, including: decision variable declarations 204; an AML objective declaration 206 (including an objective function that defines objective parameters and an objective direction); and AML constraint declarations 208 (each represented as a respective declaration c1, c2, c3 that defines a respective constraint function including constraint parameters (e.g., limits) and constraint direction).

AMLs are well known in the art and provide generic and domain-agnostic high-level languages and can be used to represent optimization problems in a language that is close to the mathematical algebraic formulation of the problem (see for example reference documents: [D. K. a. A. M. A. Brooke, GAMS: A User's Guide, Redwood City, Calif.: The Scienti, 1992.]; and [J. B. a. A. Meeraus., "On the development of the general algebraic modeling system in a strategic planning environment," Mathematical Programming Study, vol. 20, pp. 1-29, 1982.]. One particular advantage of some algebraic modeling languages, like Advanced Interactive Multidimensional Modelling System (AIMMS), AMPL, General Algebraic Modelling system (GAMS), MathProg, Mosel, and Optimization Programming Language (OPL) is the similarity of their syntax to the mathematical notation of optimization problems. This allows for a very concise and readable definition of optimization problems, which is supported by certain language-element-like sets, indices, algebraic expressions, powerful sparse index and data handling variables, and constraints with arbitrary names. An AML formulation of an optimization problem is not used directly to solve an optimization problem; instead, it is mapped to a solver language and provided to an appropriate solver (e.g., optimization solver 164) that obtains a solution to the optimization problem.

Although a specific AML is illustrated in the OP AML formulation 172 shown in FIG. 2, different AMLs other than the illustrated language can be used for the OP AML formulation 172 in different examples embodiments.

Figure 3:
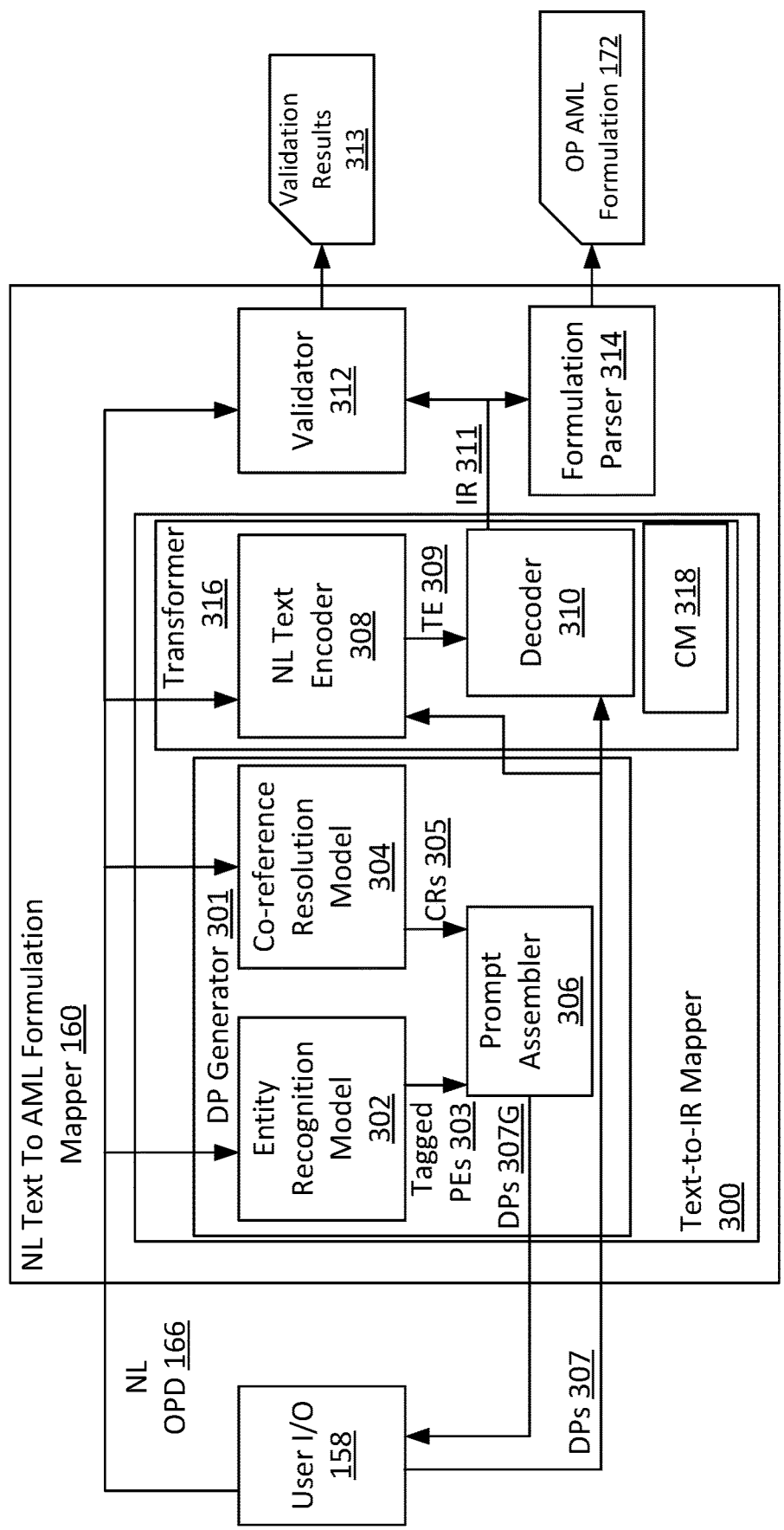
FIG. 3 is a block diagram showing the NL text to AML formulation mapper in greater detail, according to an example aspect of the disclosure.

Referring to FIG. 3, an example of NL text to AML formulation mapper 160 will now be described in accordance with example aspects of the present disclosure. The translation of a natural language description directly to an AML formulation can be very difficult. Accordingly, rather than perform a direct mapping, the NL text to AML formulation mapper 160 applies a two-stage process to map the text of the NL OPD 166 to the OP formulation 172. In a first stage, the NL OPD 166 is mapped to a text markup language intermediate representation (IR) 311 (hereafter referred to as "IR 311") by a text-to-IR mapper 300. In a second stage, the IR 311 is parsed by a formulation parser 314 to generate the OP AML formulation 172. As will be described in greater detail below, the NL text to AML formulation mapper 160 can also include a validator 312 for validating the IR 311 generated by text-to-IR mapper 300 and the OP AML formulation 172 generated by formulation parser 314.

For illustrative purposes, an example IR 211 generated by text-to-IR mapper 300 is shown in FIG. 4. The text of IR 211 shown in FIG. 4 corresponds to the text of NL OPD 166 shown in FIG. 2. As indicated in FIG. 4, the IR 211 represents the optimization problem from NL OPD 166 as a set of intermediate representation (IR) declarations 402, 403, 404, 406 using a text markup language. The IR declarations can include an objective declaration (e.g., IR objective declaration 402) to represent the objective function of the optimization problem described in NL OPD 166 and a set of constraint declarations (e.g., IR constraint declarations 403, 404, 406) that represent the constraints of the optimization problem described in NL OPD 166. The markup language used for IR declarations is a human-readable text format that includes sequences of text tokens. The tokens can include: (i) copied tokens that are extracted from the text of NL OPD 166 using a copy mechanism (CM) described below (e.g., "maximize" in sequence 412, and the tokens "average" and "performance" included in the text entity 410 in sequence 414); (ii) assigned tokens that are assigned based on entities included in the text of NL OPD 166 (assigned tokens are included within square brackets "[ . . . ]" in the IR 211 as illustrated and are used for constraint entities (e.g., "SUM_CONSTRAINT" in sequence 422) as well as for mathematical operator entities (e.g., "times" and "plus" in sequence 416)); and (iii) tag tokens (hereinafter "tags"), that are predefined and are used to classify respective entities that are bracketed within a tag pair. Tags are indicated by angle brackets "< . . . >", with a forward slash used to indicate a terminal tag in a tag pair. For example in sequence 412, "<OBJ_DIR> maximize </OBJ_DIR>" the tag OBJ-DIR classifies the entity "maximize" as an objective direction type of entity.

In the illustrated example, the markup language used for the IR 211 can be similar to XML.

Illustrative examples of entity classification types and corresponding predefined tags used to indicate the types can include:

TABLE 1

Illustrative Examples of Entity Types

| Entity Type | Tag |
|---|---|
| Constraint Direction (Indicates direction of a constraint, e.g., "greater than", "less than", "at most", "at least", "minimum of") | CONST_DIR |
| Constraint Limit Parameter | LIMIT |
| Constraint Type (Indicates type of constraint, e.g. SUM-CONSTRAINT, RATIO_CONSTRAINT, UPPER_BND, LOWER_BND) | CONST_TYPE |
| Constraint Name | CONST_NAME |
| Decision Variable | VAR |
| Objective Parameter | PARAM |
| Objective Name | OBJ_NAME |
| Objective Direction (Indicates direction of optimization objective, e.g., minimize, maximize) | OBJ_DIR |

In the above list, all of the entity types include one or more text tokens extracted and copied from the text of the NL OPD 166 with the exception of constraint type, where the token is selected from a defined set of candidate assigned token types based on the text of NL OPD 166.

As indicated in FIG. 4, the start and end of each IR declaration 402, 404, 406, 408 is indicated by a respective tag pair: start tag <DECLARATION> and end tag </DECLARATION>. Each IR declaration includes sequences of tokens that form tagged text entities. In examples, these sequences can fall within different categories. For example, sequence categories can include (i) declaration trigger; (ii) declaration context; (iii) declaration type; and (iv) algebraic expression. In the case of an objective declaration (for example IR objective declaration 402), the declaration trigger sequence can correspond to an Objective Direction tagged text entity (for example the sequence 412 "<OBJ_DIR> maximize </OBJ_DIR>"). In the case of a constraint declaration (for example constraint IR declaration 404), the declaration trigger sequence can correspond to a Constraint Direction tagged text entity (for example the sequence 418 "<CONST_DIR> total <CONST_DIR>").

In the case of an objective declaration, the declaration context sequence can correspond to an Objective Name tagged text entity (for example the sequence 414 "<OBJ_NAME> average performance </OBJ_NAME>"). In the case of a constraint declaration, the declaration context sequence can correspond to a Constraint Limit tagged text entity (for example the sequence 420 "<CONST_DIR> total </CONST_DIR>") and/or a Constraint Name tagged entity.

An example of a declaration type sequence is the Constraint Type tagged text entity, for example the sequence 422 "<CONST_TYPE>[SUM_CONSTRAINT]</CONST_TYPE>".

An example of an algebraic expression sequence can be a sequence of Variable tagged text entities and Parameter tagged text entities interspersed with text mathematical operator tokens, for example the sequence 416 "<VAR> REIT fund </VAR>[times]<PARAM>7.30/</PARAM> [plus]<VAR> dividend ETF </VAR>[times]<PARAM>10.20/</PARAM>".

Referring again to FIG. 3, in example embodiments the Text-to-IR Mapper 300 uses a pre-trained transformer 316 to generate the IR declarations that form the content of IR 311. The transformer 316 includes a bidirectional natural language text encoder 308 and an auto-regressive decoder 310 to generate the IR declarations included in IR 311. The transformer 316 can be implemented based on known pre-trained transformer model architectures, including for example: BART [Lewis, M et al., "BART: Denoising Sequence-to-Sequence Pre-training for Natural Language Generation, Translation, and Comprehension", In Proceedings of the 58th Annual Meeting of the Association for Computational Linguistics, pages 7871-7880, Online. Association for Computational Linguistics, 2020.], T5 [Colin Raffel, Noam Shazeer, Adam Roberts, Katherine Lee, Sharan Narang, Michael Matena, Yanqi Zhou, Wei Li, and Peter J. Liu. 2020. Exploring the limits of transfer learning with a unified text-to-text transformer. Journal of Machine Learning Research, 21(140):1-67.] or GPT [Radford, A., & Narasimhan, K. "Improving Language Understanding by Generative Pre-Training.", 2018 Brown, Tom et al. "Language Models are Few-Shot Learners.", 2020.]

In some examples, NL text encoder 308 and decoder 310 are trained using a dataset of problem descriptions and their corresponding IRs. The NL text encoder 308 learns useful embeddings of the NL optimization problem description. The decoder 310 learns an IR grammar space for the IR and decodes the IR based on a vocabulary of the tokens from the input description and of the predefined tokens (e.g., tags and assigned tokens such as constraint direction tokens and arithmetic operator tokens) defining the IR grammar space.

In example embodiments, in order to improve the accuracy and performance of transformer 316 and support interactivity with user 156, declaration prompts (DPs) 307 are generated and used to guide the operation of the natural language text encoder 308 and decoder 310. As will be described in greater detail below, a declaration prompt (DP) 307 is a markup language text prefix that is added to the text of the NL OPD 166 before it is provided to the natural language text encoder 308. Declaration prompts (DPs) 307 include objective and constraint DPs. As described in greater detail below, the objective DP includes information derived from the NL OPD 166 about the optimization problem objective. Each Constraint DP includes information derived from the NL OPD 166 about a respective optimization problem constraint.

Referring to FIG. 3, in example embodiments the Text-to-IR Mapper 300 includes a declaration prompt generator 301 for generating Declaration prompts (DPs) 307. In the illustrated example, declaration prompt generator 301 includes an entity recognition model 302, a co-reference resolution model 304 and a prompt assembler 306.

The entity recognition model 302, and co-reference resolution model 304 each include respective machine learning models. The entity recognition model 302 is trained to identify and classify (i.e., tag) entities in the NL OPD 166 that correspond to a set of pre-defined optimization problem type categories (for example, the entity types shown in Table 1). The co-reference resolution model 304 is trained to relate different mentions of the same entity (e.g. a variable or the objective name) found in the NL OPD 166. The prompt assembler 306 then applies a rules-based algorithm using the tagged entities' tokens and entity types (referred to hereafter as tagged problem entities (PE) 303) generated by entity recognition model 302 and the co-references (CRs) 305 identified by co-reference resolution model 304 in order to create the declaration prompts.

By way of example, FIG. 5 shows the text of NL OPD 166 corresponding to the example of FIGS. 2 and 4 with boxes used to indicate tokens (or sets of tokens) that corresponds to PEs 303 identified by entity recognition model 302. Table 2 below includes a list of the PEs 303 and their respective entity type classification (Tag) assigned by entity recognition model 302, together with co-references (CR 305) (by index number) identified by co-reference resolution model 304.

TABLE 2

Entities identified, tagged and co-referenced in NL OPD 166

| Index | Problem Entity (PE 303) | Entity Type (Tag) | Co-Reference (CR 305) |
|---|---|---|---|
| 1 | total | CONST_DIR | |
| 2 | $15000 | LIMIT | |
| 3 | REIT fund | VAR | 11 |
| 4 | average return | OBJ_NAME | 7, 16 |
| 5 | 7.3% | PARAM | |
| 6 | dividend ETF | VAR | 14 |
| 7 | average return | OBJ_NAME | 4, 16 |
| 8 | 10.2% | PARAM | |
| 9 | at most | CONST_DIR | |
| 10 | 40% | LIMIT | |
| 11 | Real-estate | VAR | 3 |
| 12 | minimum | OBJ_DIR | |
| 13 | 30% | LIMIT | |
| 14 | dividend ETF | VAR | 6 |
| 15 | maximize | OBJ_DIR | |
| 16 | Average performance | OBJ_NAME | 4, 7 |

The lists provided in Table 2 are provided as inputs to prompt assembler 306 which executes a rules-based algorithm to assemble declaration prompts 307G based on the tagged PEs 303 and CRs 305. As can be seen in the above table, the entity indicated by indexes 4, 7 and 16 (e.g., "average return", "average return", average performance", respectively) have each been tagged as the objective name, and have been identified as co-references to a common entity, despite the terminology differences.

Figure 6:
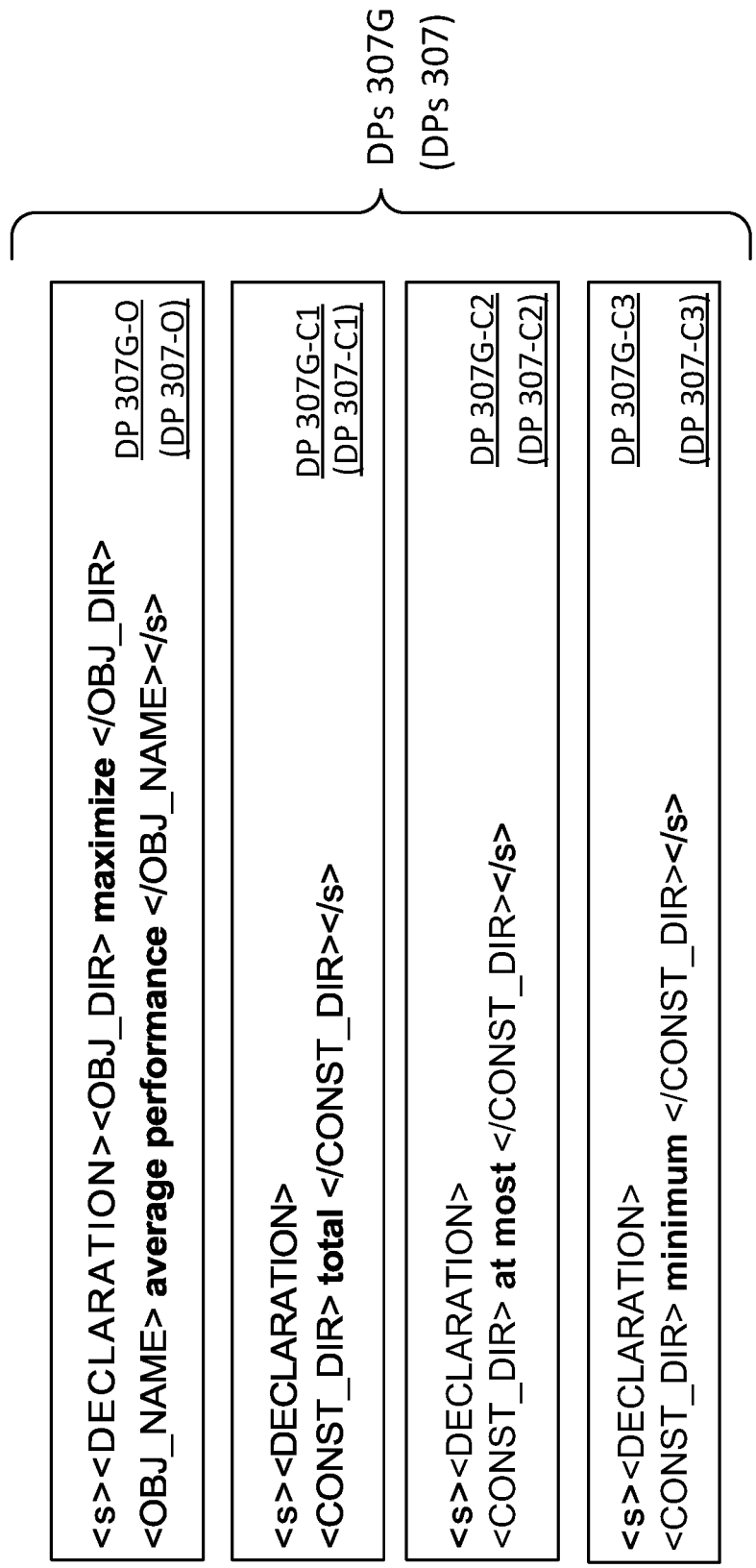
FIG. 6 shows an illustrative example of a set of declaration prompts generated by a declaration prompt generator of the text to IR mapper of the NL text to AML formulation mapper.

FIG. 6 illustrates examples of a set of DPs 307G generated by prompt assembler 306 for the NL OPD 166 text example of FIGS. 2, 4, 5, based on the tagged entity and co-reference data included in Table 2.

The DPs 307G include: (i) an objective declaration prompt DP 307G-O which includes a declaration trigger (i.e., the tagged objective direction sequence "<OBJ_DIR> maximize </OBJ_DIR> and a declaration context (i.e., the tagged objective name sequence <OBJ_NAME> average performance </OBJ_NAME> </s>; and (ii) a set of constraint declaration prompts DP 307-C1, DP 307-C2, and DP 307-C3, each corresponding to a respective constraint type entity detected in NL OPD 166. As shown in FIG. 6, each constraint declaration prompt includes a declaration trigger (i.e., the tagged constraint direction sequence "<CONST_DIR> total <CONST_DIR> in the case of constraint declaration prompt DP 307G-C2. In some examples, the constraint declaration prompt could also include a declaration context, which for example could be a tagged constraint name sequence.

As illustrated in FIGS. 1 and 3, in at least some examples, the generated declaration prompts (DPs) 307G are provided by the NL Text to AML Formulation Mapper 160 to user I/O 158 for presentation via an output device such as a display device to user 156. User can use an input device (for example a keyboard) of user I/O 158 to accept, reject, and/or edit one or more of the generated declaration prompts (DPs) 307G, to provide a user selected set of final declaration prompts DPs 307 that are returned to the NL Text to AML Formulation Mapper 160. This provides the user 156 with the opportunity to confirm the accuracy of the generated declaration prompts (DPs) 307G and amend them as required before they are applied to the transformer 316, which in turn can improve the accuracy of the transformer 316. In example embodiments, the markup language used for declaration prompts (DPs) 307G, 307 is the same as the markup language used for the declarations included in IR 211. Because the declaration prompts (DPs) 307G, 307 are coded using a high-level text based language, in at least some scenarios they can be easily understood by a user 156 who may be familiar with the markup language and may be a domain expert but who is not an expert in any of AML or Solver languages or optimization problem formulations.

In some examples, the provision of generated DPs 307G to user I/O 158 for review, confirmation and/or editing by user 156 is optional or is omitted, in which case the generated DPs 307G can be used directly as the final declaration prompts DPs 307.

Figure 7:
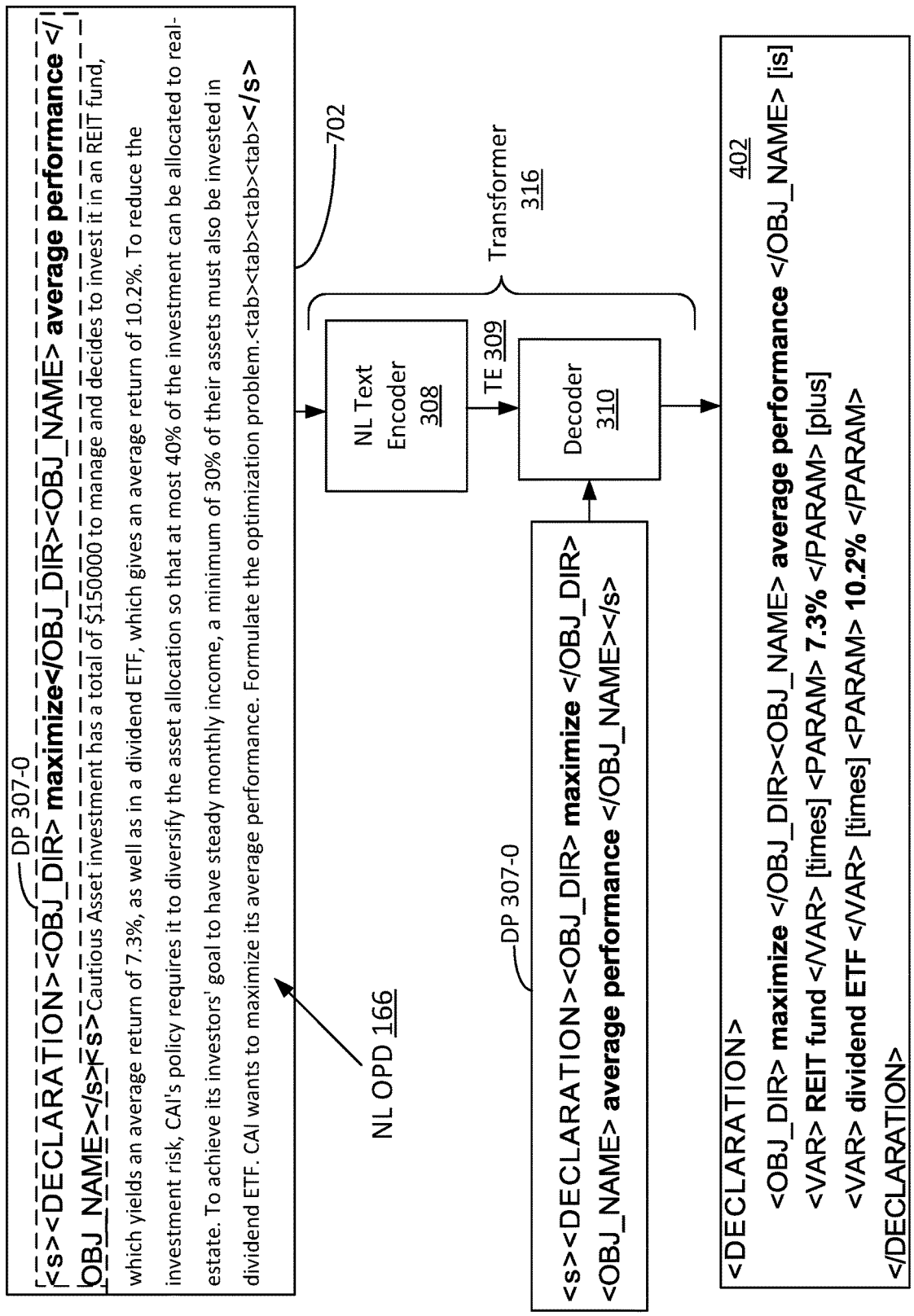
FIG. 7 shows an example of an IR to AML formulation mapping performed in respect of an objective declaration by a transformer of the NL text to AML formulation mapper.
Figure 8:
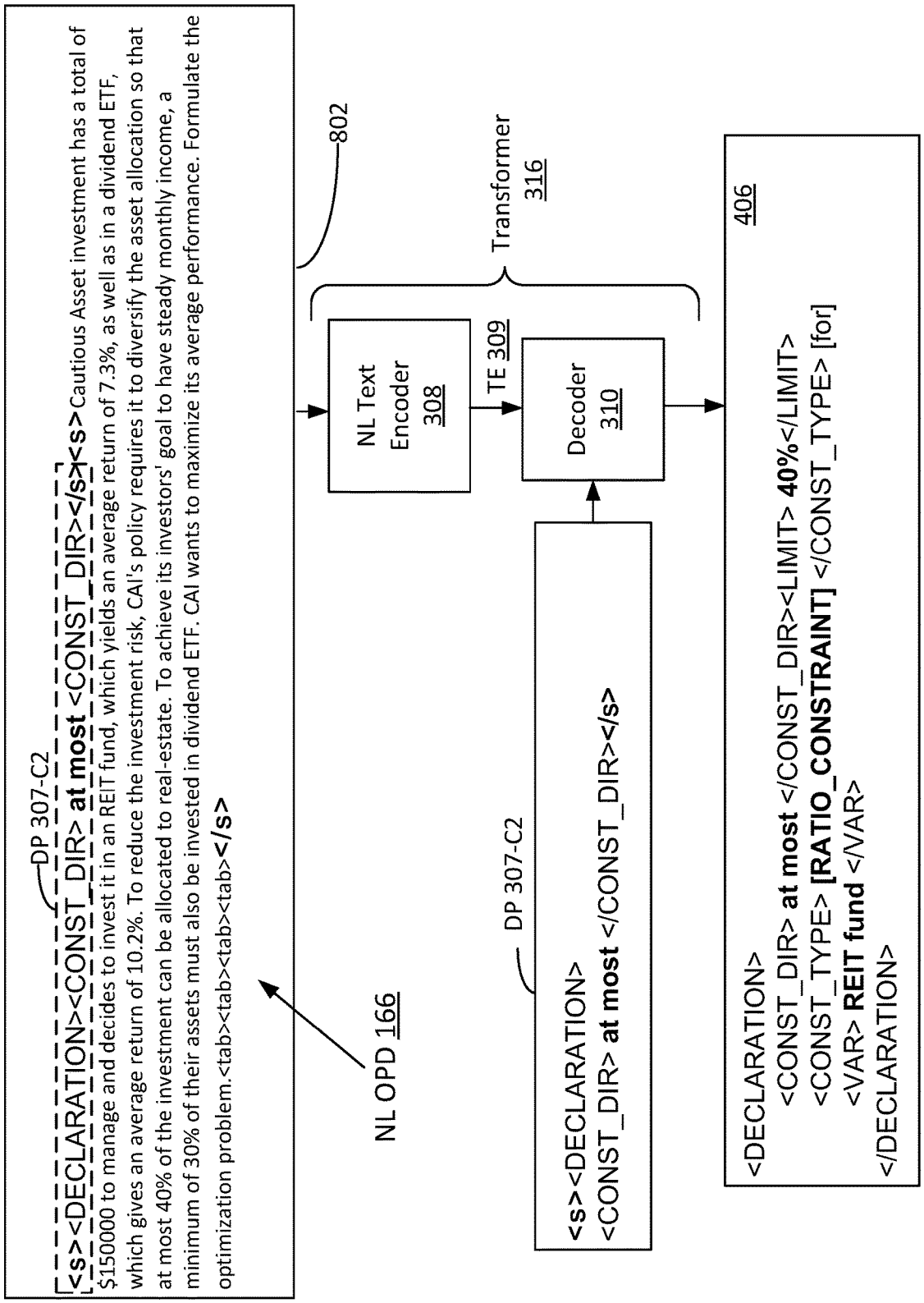
FIG. 8 shows a further example of an IR to AML formulation mapping performed in respect of a constraint declaration by the transformer.

Referring again to FIG. 3, the final DPs 307 are provided as a further input to the transformer 316 together with the NL OPD 166. FIG. 7 shows an example of declaration prompt guided NL OPD to IR mapping performed by transformer 316 to generate the IR objective declaration 402 and FIG. 8 shows the mapping performed to generate the IR constraint declaration 406.

As shown in FIG. 7, the transformer prepends the objective declaration prompt DP 307-0 to the text of NL OPD 166, and the combined text is provide as a text input 702 to NL text encoder 309, which outputs a respective set of text embeddings 309. The text embeddings 309 are provided as inputs to decoder 310 together with a further copy of the objective declaration prompt DP 307-0, which then outputs corresponding IR objective declaration 402 for inclusion in IR 211. Each of the individual constraint declaration prompts DP 307-C1, 307-C2 and 307-C3 are processed in a similar manner, as illustrated in FIG. 8 for the case of constraint declaration prompt DP 307-C2. In FIG. 8, the transformer prepends the constraint declaration prompt DP 307-C2 to the text of NL OPD 166, and the combined text is provide as a text input 802 to NL text encoder 309, which outputs a respective set of text embeddings 309. The text embeddings 309 are provided as inputs to decoder 310 together with a further copy of the constraint declaration prompt DP 307-C2, which then outputs corresponding objective declaration 406 for inclusion in IR 211.

In such a manner, the transformer 316 individually processes each the objective declaration prompts DP 307-0 and each of the respective constraint declaration prompts DP 307-C1 to DP 307-C3 in combination with the text of NL OPD 166, thereby generating the respective IR objective declaration 402 and IR constraint declarations 404, 406, 408 that make up IR 211.

As noted above in respect of FIG. 4, the tokens that are included in the declarations that make up IR 211 can include: (i) copied tokens that are extracted from the text of NL OPD 166 (e.g., "maximize" in sequence 412); (ii) assigned tokens (included in square brackets) that are generated based on entities included in the text of NL OPD 166 (e.g., constraint direction tokens such as "SUM_CONSTRAINT" in sequence 422) as well as for mathematical operator entities (e.g., arithmetic operator tokens such as "times" and "plus" in sequence 416)); and (iii) tag tokens ("tags"), that are predefined and are used to classify respective entities that are bracketed within a tag pair. The assigned tokens each belong to a set of predefined candidate assigned tokens, and the tags each belong to a set of predefined candidate tags.

During training, the transformer 316 is trained to map NL OPDs prepended with a respective declaration prompts to respective declarations that using supervised training. The NL text encoder 308 learns to generate useful text embeddings TE 309 of the declaration prepended NL OPD 166. The decoder 310 learns the grammar of the IR declarations and decodes the IR declarations based on the vocabulary of tokens that are included in the text of the NL OPD 155, the vocabulary of assigned tokens (e.g., constraint direction tokens, arithmetic operator tokens) and the vocabulary of tags. These three categories of tokens collectively define a set of tokens that form an IR grammar space for the text the IR 311.

The use of copied tokens extracted from the input natural language text of NL OPD 166 is an advantageous feature in at least some scenarios that can enable improved transformer mapping accuracy when compared to solutions that rely only on assigned tokens. This is because a key requirement of the NL text-to-IR formulation mapping is the ability to extract variable names and data parameters from the NL description and copy these important names and parameters from the input NL description into the output IR 311 of the decoder 310. To augment the capability of the transformer 316, the transformer 316 applies a copy mechanism (CM) 318 that computes a probability distribution over the input tokens included in NL OPD 166. The decoder 310 includes a plurality of attention heads that each generate respective attention scores. One way to compute the probability distribution over the input token distribution is by taking a mean of the decoder 310's cross-attention scores across the attention heads of the decoder 310 as follows:

$$e = \frac{(W_S S_t)^T W_h h_i}{\sqrt{d_k}}$$

$$\alpha_{t,i} = \text{softmax}(e_{t,i})$$

$$P_{copy} = \frac{1}{n_H} \Sigma \alpha_{t,i}$$

Where $W_S$ and $W_h$ are the projection matrices for the encoder and the decoder, $S_t$, $h_i$, and $n_H$ are the decoder hidden state at time step t, the encoder hidden state for the attention head I, and the number of heads, respectively.

In the case where copied tokens correspond to multiple co-referenced entities in the NL OPD 166 (for example variable entities "REIT fund" and "real estate"), then a common version of the co-referenced entity may be copied and used for copied tokens corresponding to all occurrences of the co-referenced entities (for example, the first occurring co-referenced entity version, "REIT fund" but not "real estate" will be included in the IR grammar space for the text the IR 311).

Figure 9:
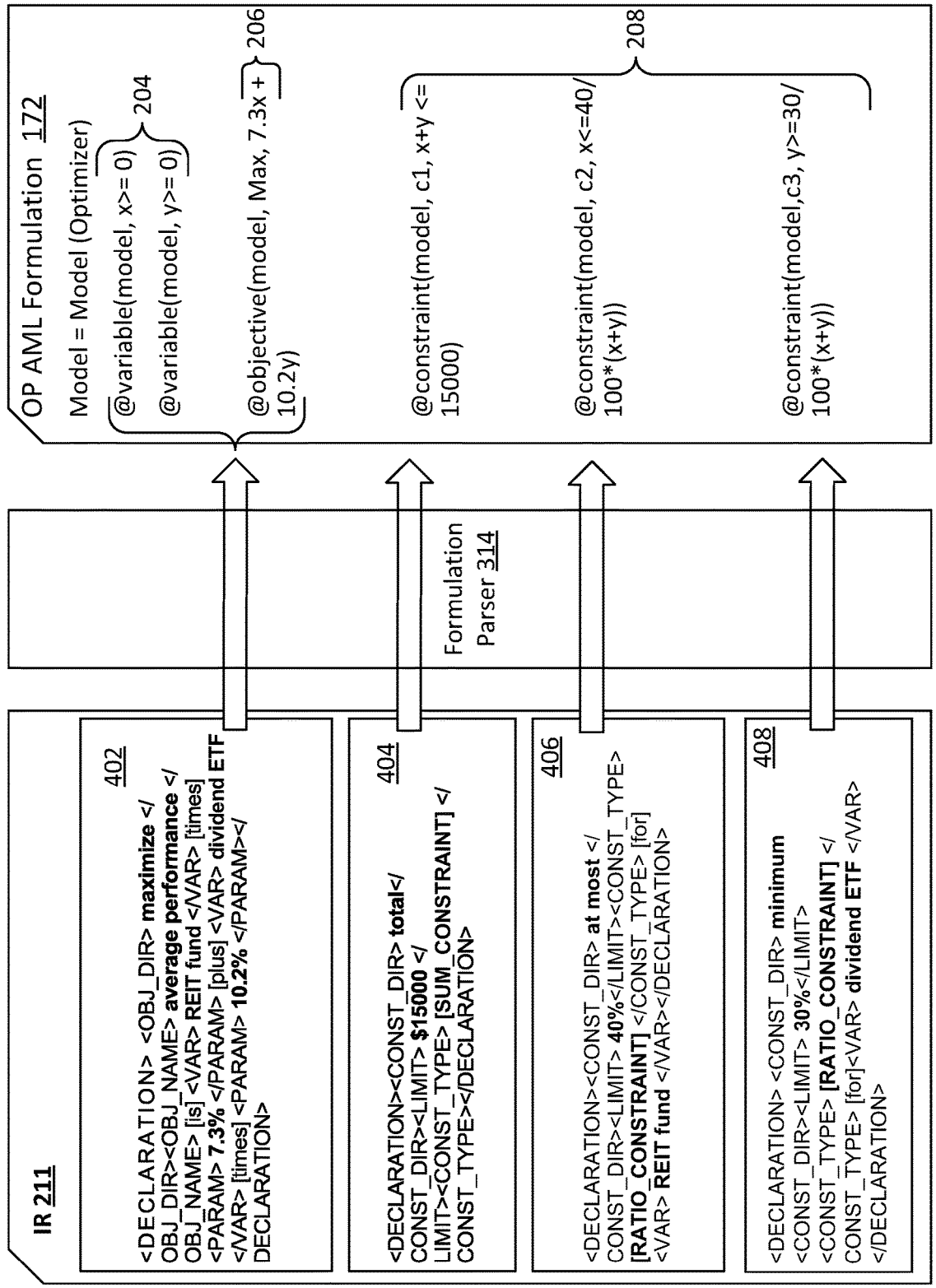
FIG. 9 shows an illustrative example of IR to AML formulation mapping performed by a formulation parser of the NL text to AML formulation mapper.

Referring again to FIG. 3, as noted above, once the IR 311 is generated, the second stage of the mapping of the text of NL OPD 166 to an OP AML formulation 172 is performed by formulation parser 314. In example embodiments, the formulation parser 314 maps the declarations included in the IR 311 one-by-one from IR markup language to a respective AML representation. An example of this mapping is illustrated in FIG. 9 for the example IR 211 of FIG. 4 and OP AML Formulation of FIG. 2. In example embodiments, the formulation parser 314 parser can be implemented, for example, by either a standard context-free grammar (CFG) parser or by a Seq2Seq model parser.

As noted above, the NL Text To AML Formulation Mapper 160 can optionally include a validator 312 for detecting mapping errors in the generated IRs 311 and the OP AML formulations 172. For example, in the illustrated embodiments, the validator 312 can include an machine learning model based IR checker 380 (shown in FIGS. 10 and 11 and described below) for detecting NL to IR mapping errors in a generated IRs 311, and a machine learning model based formulation checker 380 (shown in FIG. 13 and further described below) for detecting IR to AML mapping errors in a OP AML formulation.

Figure 10:
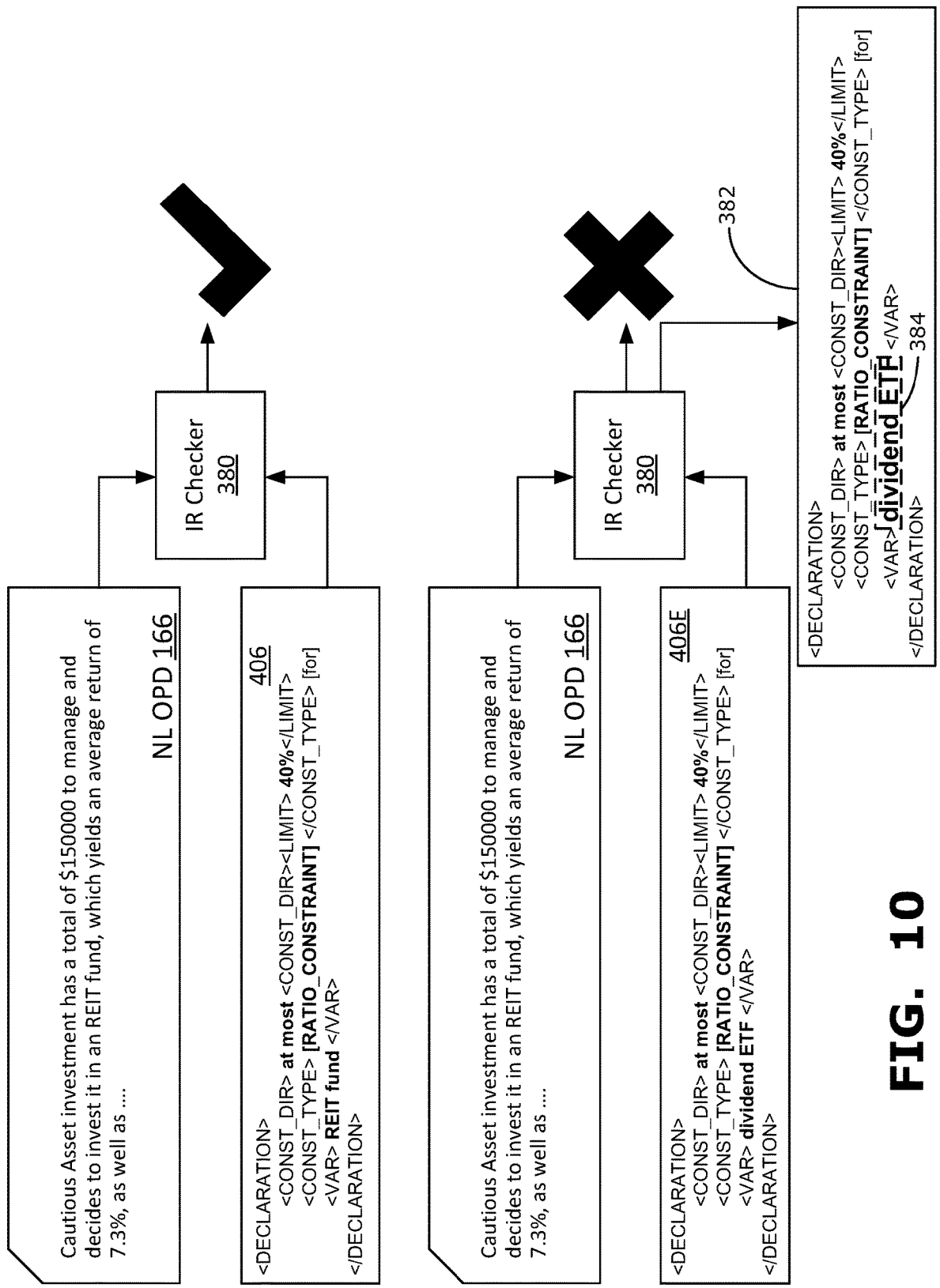
FIG. 10 shows examples of validations performed by an IR checker of a validator of the NL text to AML formulation mapper.

FIG. 10 illustrates two examples of the operation of IR checker 380. In the top example, the IR checker 380 receives the text of NL OPD 166 as one input and the markup language IR constraint declaration 406 from IR 211 as a second input. In such example, the IR checker 380 determines that the IR constraint declaration 406 is a correctly mapped and outputs a positive validation result (represented as checkmark in FIG. 10) for the IR constraint declaration 406. In the bottom example, the IR checker 380 receives the text of NL OPD 166 as one input and an example of an erroneous markup language constraint declaration 406E from IR 211 as a second input (the variable entity has been erroneously mapped to "dividend ETF" rather than "REI Fund"). In such example, the IR checker 380 determines that the constraint declaration 406E includes an erroneous mapping and outputs a negative validation result (represented as an "X" in FIG. 10) for the constraint declaration 406E. Furthermore, IR checker 380 generates a validation output 382 that identifies the erroneously mapped entity 384.

Thus, IR checker 380 can be used to individually evaluate the NL to IR mapping for each of the IR declarations in the IR 211 and generate respective validation results 313.

Figure 11:
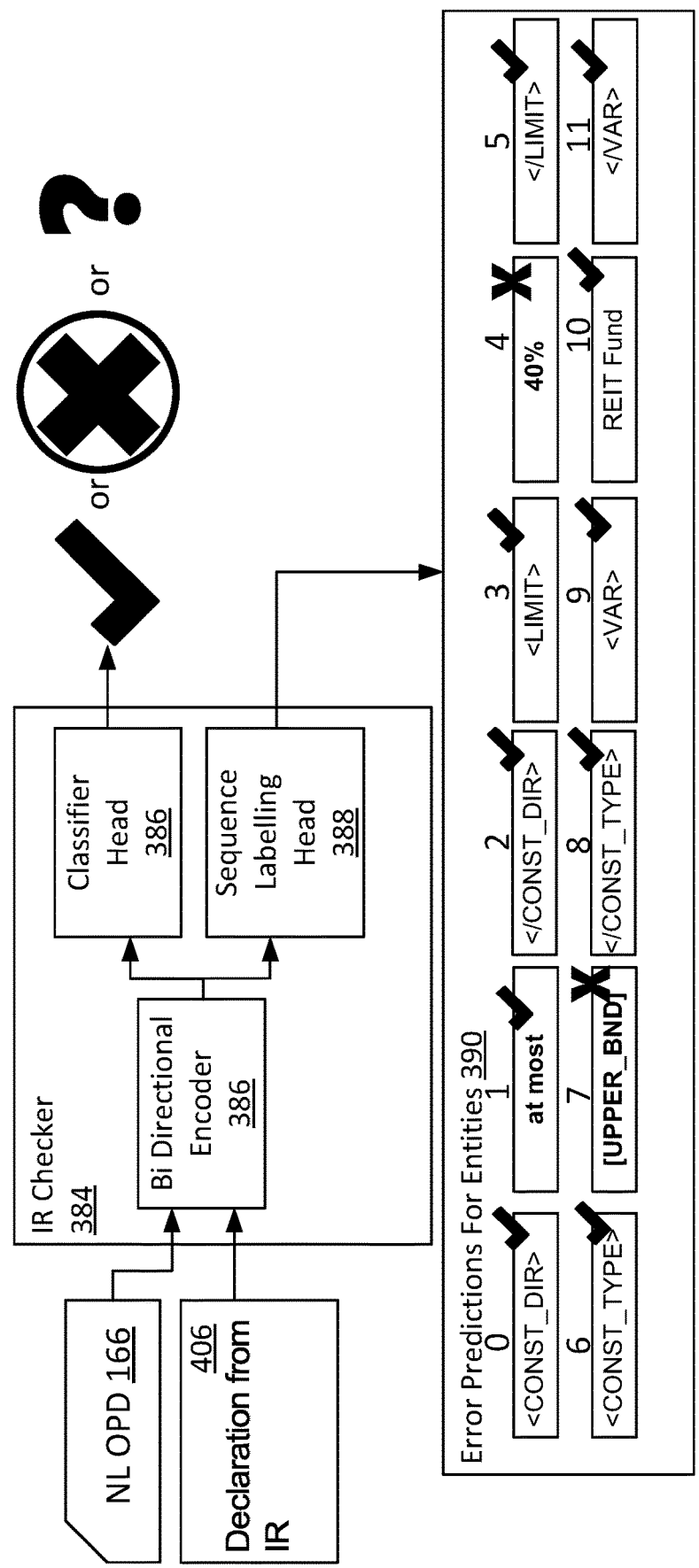
FIG. 11 is a block diagram showing the IR checker in greater detail according to an example aspect of the disclosure.

An example configuration for IR checker 380 is shown in FIG. 11. The illustrated IR checker 380 includes a pretrained bidirectional encoder 386, classifier head 386 and sequence labelling head 388. Bidirectional encoder 386 is trained to generate embeddings based on the input NL OPD 166 and an IR declaration (for example IR constraint declaration 406 from IR 211). The embeddings are provided to classifier head 386 and sequence labelling head 388. The classifier head 386 outputs an overall validation result for the subject declaration (e.g., one of positive, negative, or unknown) and the sequence labelling head 388 outputs error predictions 390 for each of the entities that are included in the declaration. These error predictions are used to generate the validation output 382 that identifies the erroneously mapped entity(ies) 384. In the example of FIG. 11, the entities indexed by 4 and 7 (e.g., "40%" and [UPPER_BND], respectively) are predicted to be erroneous and labelled as such.

Figure 12:
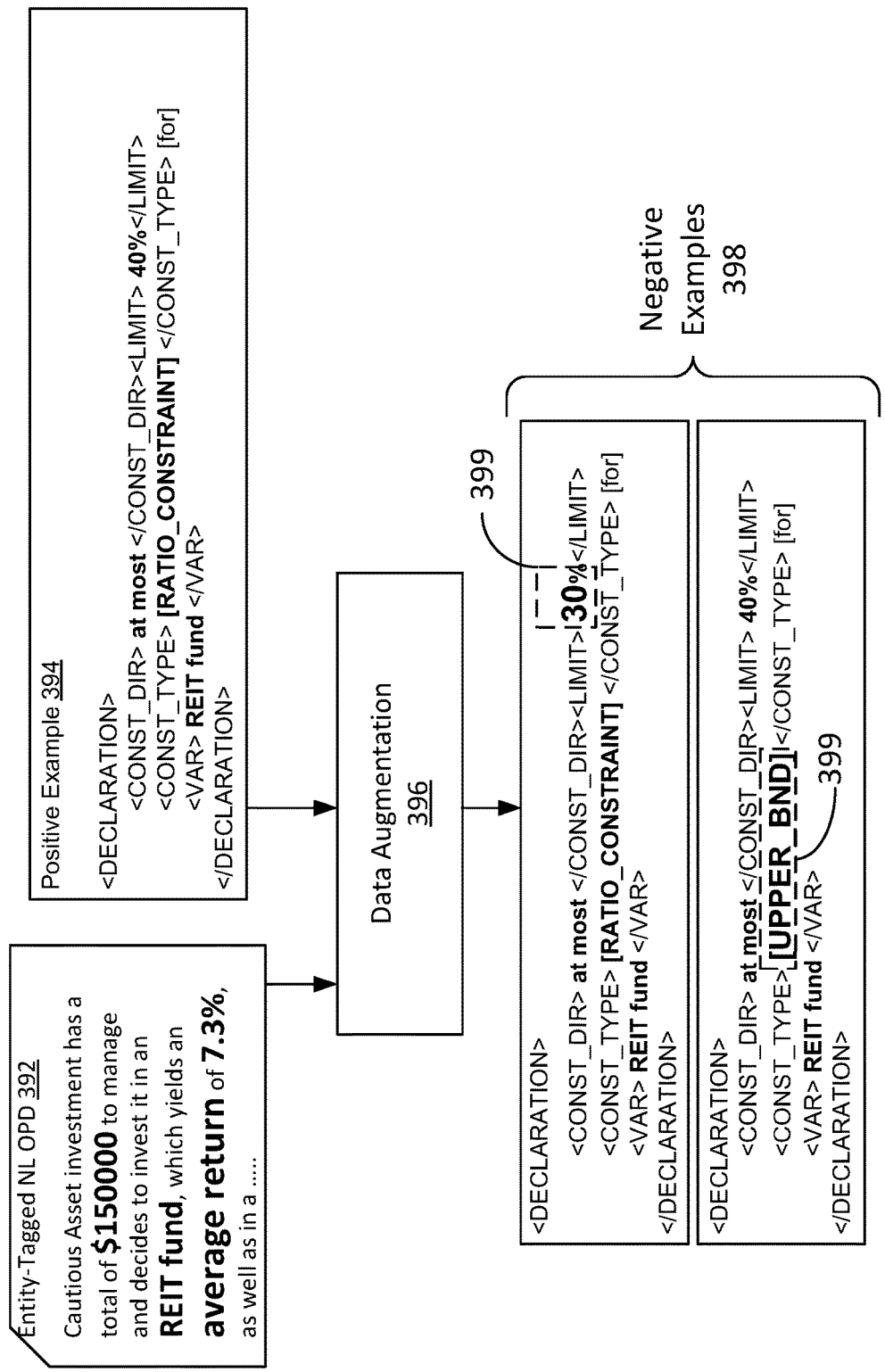
FIG. 12 illustrates an example of a data augmentation method performed by a data augmentation module to augment a training dataset for the IR checker.

In example embodiments, the training dataset used to trained IR checker 384 is composed of NL problem descriptions and their target IR declarations. In order to create negative training examples so that the IR checker 384 can learn to distinguish between valid and invalid mapping declarations a data augmentation method can be applied to the positive (i.e., ground truth) target IR declarations included in the training dataset to create negative or adversarial examples. In this regard, as shown in FIG. 12, a data augmentation module 396 can be used to perturb a positive IR declaration example 394 from the training dataset and swap some of its tokens into erroneous tokens copied or assigned based on a tagged version of its corresponding NL problem description. The resulting negative examples 398 (which include erroneous entities 399) can then be added to the training dataset.

Figure 13:
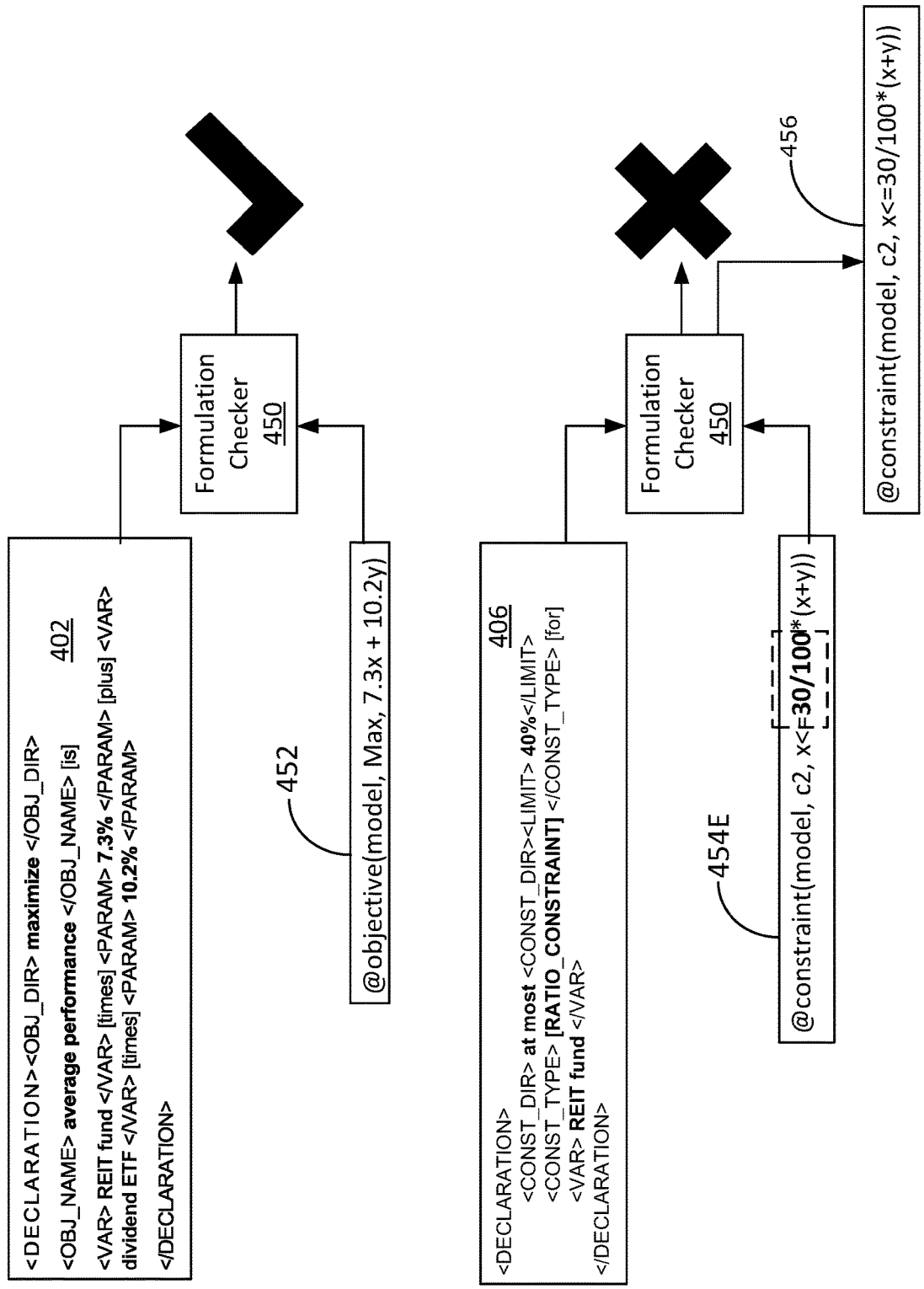
FIG. 13 shows examples of validations performed by a formulation checker of the validator of the NL text to AML formulation mapper.

With reference to FIG. 13, machine learning model based formulation checker 450 can similarly be trained and used for the detection of mapping errors from the IR declarations to their respective AML representations included in AML formulation 172. FIG. 13 illustrates two examples of the operation of formulation checker 450. In the top example, the formulation checker 450 receives the IR objective declaration 402 as one input and the AML objective declaration 452 as a second input. In such example, the formulation checker 450 determines that the AML objective declaration 452 is correctly mapped and outputs a positive validation result (represented as checkmark in FIG. 13). In the bottom example, the formulation checker 450 receives the IR constraint declaration 406 as one input and an example of an erroneous AML constraint declaration formulation 454E as a second input (the constraint limit has been erroneously mapped to "3%/100" rather than "4%/100"). In such example, the formulation checker 450 determines that the AML constraint declaration 454E includes an erroneous mapping and outputs a negative validation result. Furthermore, formulation checker 450 generates a validation output 456 that identifies the erroneously mapped declaration.

The formulation checker 450 may use a similar architecture to that of IR checker 384 and also make use of a training data augmentation method to generate negative formulation examples.

Referring again to FIG. 3, the validation results 313 generated by IR checker 384 and formulation checker 450 can be a combination of the following: (1) a binary classification result, (2) a confidence score or (3) a sequence of binary tags for tagging invalid tokens. Additionally, in some examples the validation results 313 can be provided to user I/O 158 so that they can be highlighted and communicated to the user 156 using an interactive modeling user interface.

Referring to FIG. 1, the OP AML Formulation 172 can be mapped to an OP solver language representation 174 of the optimization problem using an AML to Solver Language Mapper 162 that is suitable for the type of AML that is used. The OP solver language representation 174 can then be provided to optimization solver 164 to be solved. In some examples, the solution results can be communicated to user 156 through the user I/O 158. Both AML to Solver Language Mapper 162 and optimization solver 164 can be implemented using available software based solutions.

FIG. 14 is a flow chart 1400 summarizing the two-stage mapping performed by NL text to AML formulation mapper 160 according to example embodiments. In particular, the two-stage mapping performed by NL text to AML formulation mapper 160 begins at block 1402. At block 1402, NL text to AML formulation mapper 160 receives a natural language text description of an optimization problem. NL text to AML formulation mapper 160 then generates, as per block 1404, generates, based on the natural language text description, a text markup language intermediate representation (IR) of the optimization problem, the text markup language IR including an IR objective declaration that defines an objective for the optimization problem and a first IR constraint declaration that indicates a first constraint for the optimization problem. NL text to AML formulation mapper 160, as per block 1404, generates, based on the text markup language IR, an algebraic modelling language (AML) formulation of the optimization problem, the AML formulation including an AML objective declaration that defines the objective for the optimization problem and a first AML constraint declaration that indicates the first constraint for the optimization problem.

Figure 15:
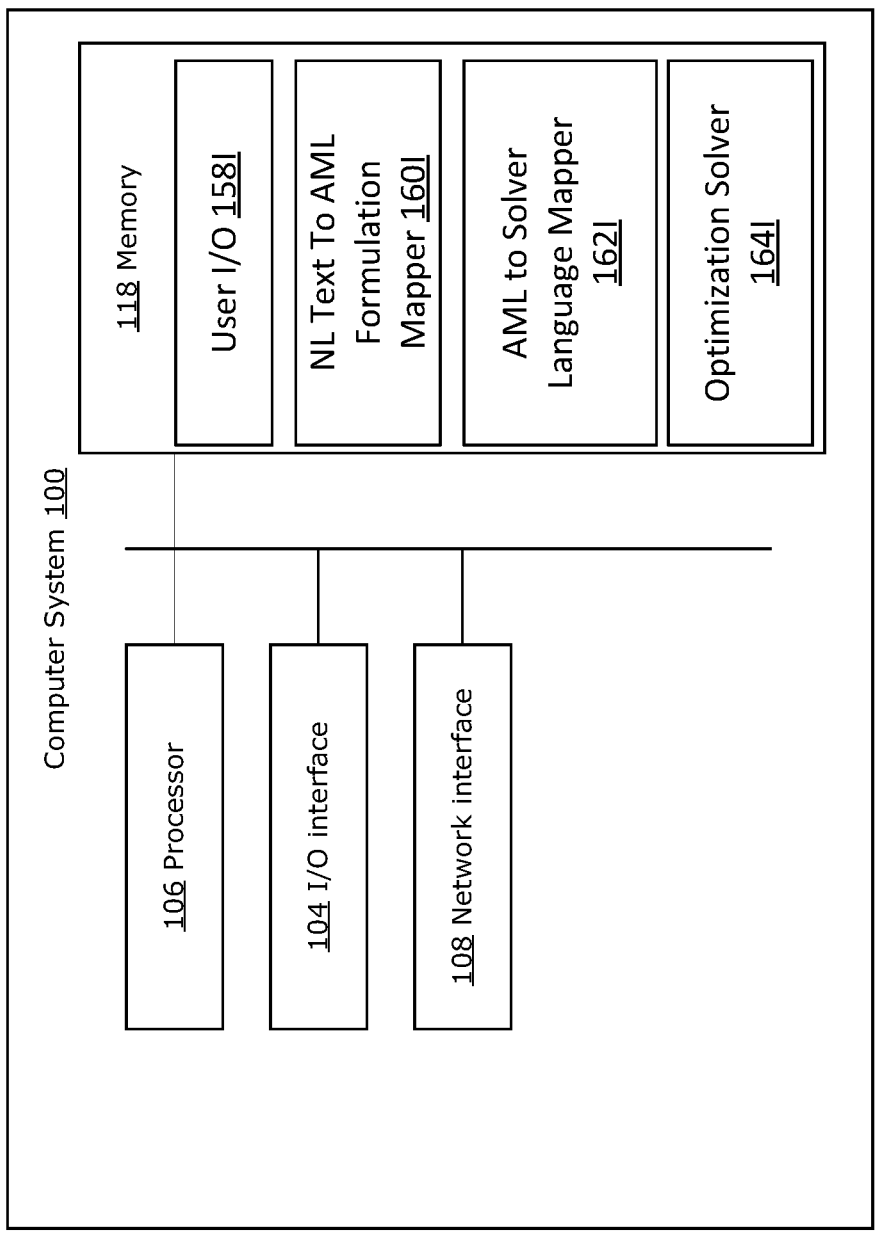
FIG. 15 is a block diagram illustrating of a computer system for implementing the evaluation module of FIG. 3, according to example embodiments.

Referring to FIG. 15, a block diagram of a computer system 100 that can be used to implement systems and methods of the present disclosure, including one or modules of the system 150 is shown. Although an example embodiment of the computer system 100 is shown and discussed below, other embodiments may be used to implement examples disclosed herein, which may include components different from those shown. Although FIG. 15 shows a single instance of each component, there may be multiple instances of each component shown.

The computer system 100 includes one or more hardware processing circuits that can include one or more processors 106 such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The computer system 100 may also include one or more input/output (I/O) interfaces 104 for interfacing with a user. The computer system 100 includes one or more network interfaces 108 for wired or wireless communication with a network (e.g., an intranet, the Internet, a peer-to-peer (P2P) network, a wide area network (WAN) and/or a local area network (LAN)) or other node. The network interface(s) 108 may include wired links (e.g., Ethernet cable) and/or wireless links (e.g., one or more antennas) for intra-network and/or inter-network communications.

The computer system 100 includes one or more memories 118, which may include volatile and non-volatile memories and electronic storage elements (e.g., a flash memory, a random access memory (RAM), read-only memory (ROM), hard drive). The non-transitory memory(ies) 118 may store instructions for execution by the processor(s) 106, such as to carry out examples described in the present disclosure. The memory(ies) 118 may store, in a non-volatile format, other non-volatile software instructions, such as for implementing an operating system and other applications/functions. The software instructions may for example include NL Text To AML Formulation Mapper instructions 1601 that when executed by the one or more processor(s) 106, configure the computer system 100 to implement the NL Text To AML Formulation Mapper 160. The software instructions may also include: User I/O instructions 1581 to configure the computer system 100 to implement User I/O 158; AML to Solver Language Mapper instructions 1621 to configure the computer system 100 to implement Solver Language Mapper 162; and Optimization Solver instructions 1641 to configure the computer system 100 to implement Optimization Solver 164.

The contents of all published documents identified in this disclosure are incorporated by reference.

Certain adaptations and modifications of the described embodiments can be made. The above discussed embodiments are considered to be illustrative and not restrictive.

The invention claimed is:

1. A computer implemented method comprising:
receiving a natural language text description of an optimization problem as a sequence of computer readable text entities, the sequence of computer readable text entities representative of a natural language speech that is spoken by a user or a natural language text inputted by the user via an input device;
generating, based on the natural language text description, a text markup language intermediate representation (IR) of the optimization problem, the text markup language IR including an IR objective declaration that defines an objective for the optimization problem-and a first IR constraint declaration that indicates a first constraint for the optimization problem, wherein the text markup language IR is generated by:
generating, based on the natural language text description, an objective declaration prompt that includes information about the objective for the optimization problem and a first constraint declaration prompt that includes information about the first constraint for the optimization problem;
providing the objective declaration prompt and the natural language text description to a transformer to generate the IR objective declaration; and
providing the first constraint declaration prompt and the natural language text description to the transformer to generate the first IR constraint declaration; and
generating, based on the text markup language IR, an algebraic modelling language (AML) formulation of the optimization problem, the AML formulation including an AML objective declaration that defines the objective for the optimization problem and a first AML constraint declaration that indicates the first constraint for the optimization problem.

2. The method of claim 1, wherein the text markup language IR also includes one or more further constraint declarations each indicating a respective further constraint for the optimization problem, and the AML formulation includes one or more further AML constraint declarations indicating the respective further constraints.

3. The method of claim 1, comprising:
mapping the AML formulation to a solver language representation of the optimization problem; and
providing the solver language representation to an optimization solver to output a solution for the optimization problem.

4. The method of claim 1, wherein generating the objective declaration prompt and the first constraint declaration prompt comprises:
recognizing, using a first trained machine learning model, declaration entities included in the natural language text description that correspond to a set of pre-defined type categories;
identifying, using a second trained machine learning model, recognized declaration entities that are co-references; and
assembling the objective declaration prompt and the first constraint declaration prompt based on the recognized declaration entities and the identified co-references.

5. The method of claim 1, comprising:
prior to providing the objective declaration prompt to the transformer, communicating the objective declaration prompt to a user input/output module to enable a user to approve or modify the objective declaration prompt; and prior to providing the first constraint declaration prompt to the transformer, communicating the first constraint declaration prompt to the user input/output module to enable the user to approve or modify the first constraint declaration prompt.

6. The method of claim 1, wherein the transformer is a machine learning based transformer that receives the natural language text description as an input, the method comprising training the transformer to extract and copy selected entities from the natural language text description into one or both of the IR objective declaration and the first IR constraint declaration.

7. The method of claim 1, further comprising:
performing an objective declaration validation check of the IR objective declaration by inputting the natural language text description and the IR objective declaration to a machine learning model that is trained to predict if an input IR declaration includes an error;
performing a constraint declaration validation check of the first IR constraint declaration by inputting the natural language text description and the first IR constraint declaration to the machine learning model; and
communicating results of the objective declaration validation check and the constraint declaration validation check to a user input/output module for presentation to a user.

8. The method of claim 7, further comprising augmenting a training dataset for training the machine learning model by generating a set of erroneous IR declarations for a respective training example of a natural language text description of a training example optimization problem by perturbing entities included in a ground truth IR declaration respective training example of the natural language text description.

9. The method of claim 1, further comprising:
performing an objective declaration validation check of the AML objective declaration by inputting the IR objective declaration and the AML objective declaration to a machine learning model that is trained to predict if an input AML declaration includes an error;
performing a constraint declaration validation check of the first AML constraint declaration by inputting the first IR constraint declaration and the first AML constraint declaration to the machine learning model; and
communicating results of the objective declaration validation check and the constraint declaration validation check to a user input/output module for presentation to a user.

10. The method of claim 1, wherein the transformer includes a natural language text encoder and a decoder, the natural language text encoder and the decoder being trained to generate the IR objective declaration and the first IR constraint declaration included in the text markup language IR.

11. A system for processing a natural language text description of an optimization problem, the system comprising one or more processors and one or more memories storing software instructions that, when executed by the one or more processors, cause the system to:
receive the natural language text description of an optimization problem as a sequence of computer readable text entities, the sequence of computer readable text entities representative of a natural language speech that is spoken by a user or a natural language text inputted by the user via an input device;
generate, based on the natural language text description, a text markup language intermediate representation (IR) of the optimization problem, the text markup language IR including an IR objective declaration that defines an objective for the optimization problem and a first IR constraint declaration that indicates a first constraint for the optimization problem, wherein the text markup language IR is generated by:
generating, based on the natural language text description, an objective declaration prompt that includes information about the objective for the optimization problem and a first constraint declaration prompt that includes information about the first constraint for the optimization problem;
providing the objective declaration prompt and the natural language text description to a transformer to generate the IR objective declaration; and
providing the first constraint declaration prompt and the natural language text description to the transformer to generate the first IR constraint declaration; and
generate, based on the text markup language IR, an algebraic modelling language (AML) formulation of the optimization problem, the AML formulation including an AML objective declaration that defines the objective for the optimization problem and a first AML constraint declaration that indicates the first constraint for the optimization problem.

12. The system of claim 11, wherein the software instructions, when executed by the one or more processors, further configure the system to: map the AML formulation to a solver language representation of the optimization problem; and
provide the solver language representation to an optimization solver to output a solution for the optimization problem.

13. The system of claim 11, wherein generating the objective declaration prompt and the first constraint declaration prompt comprises:
recognizing, using a first trained machine learning model, declaration entities included in the natural language text description that correspond to a set of pre-defined type categories;
identifying, using a second trained machine learning model, recognized declaration entities that are co-references; and
assembling the objective declaration prompt and the first constraint declaration prompt based on the recognized declaration entities and the identified co-references.

14. The system of claim 11, wherein the software instructions, when executed by the one or more processors, further configure the system to:
prior to providing the objective declaration prompt to the transformer, communicate the objective declaration prompt to a user input/output module to enable a user to approve or modify the objective declaration prompt; and
prior to providing the first constraint declaration prompt to the transformer, communicate the first constraint declaration prompt to the user input/output module to enable the user to approve or modify the first constraint declaration prompt.

15. The system of claim 11, wherein the transformer is a machine learning based transformer that receives the natural language text description as an input, and the software instructions, when executed by the one or more processors, further configure the system to pre-train the transformer to extract and copy selected entities from the natural language text description into one or both of the IR objective declaration and the first IR constraint declaration.

16. The system of claim 11, wherein the software instructions, when executed by the one or more processors, further configure the system to: perform an objective declaration validation check of the IR objective declaration by inputting the natural language text description and the IR objective declaration to a machine learning model that is trained to predict if an input IR declaration includes an error;
perform a constraint declaration validation check of the first IR constraint declaration by inputting the natural language text description and the first IR constraint declaration to the machine learning model; and
communicate results of the objective declaration validation check and the constraint declaration validation check to a user input/output module for presentation to a user.

17. The system of claim 16, wherein the software instructions, when executed by the one or more processors, further configure the system to: augment a training dataset for training the machine learning model by generating a set of erroneous IR declarations for a respective training example of a natural language text description of a training example optimization problem by perturbing entities included in a ground truth IR declaration respective training example of the natural language text description.

18. The system of claim 11, wherein the software instructions, when executed by the one or more processors, further configure the system to: perform an objective declaration validation check of the AML objective declaration by inputting the IR objective declaration and the AML objective declaration to a machine learning model that is trained to predict if an input AML declaration includes an error;
perform a constraint declaration validation check of the first AML constraint declaration by inputting the first IR constraint declaration and the first AML constraint declaration to the machine learning model; and
communicate results of the objective declaration validation check and the constraint declaration validation check to a user input/output module for presentation to a user.

19. The system of claim 11, wherein the transformer includes a natural language text encoder and a decoder, the natural language text encoder and the decoder being trained to generate the IR objective declaration and the first IR constraint declaration included in the text markup language IR.

20. A non-transitory computer readable medium storing instructions which, when executed by the one or more processors, cause the one or more processors to:
receive a natural language text description of an optimization problem as a sequence of computer readable text entities, the sequence of computer readable text entities representative of a natural language speech that is spoken by a user or a natural language text inputted by the user via an input device;
generate, based on the natural language text description, a text markup language intermediate representation (IR) of the optimization problem, the text markup language IR including an IR objective declaration that defines an objective for the optimization problem and a first IR constraint declaration that indicates a first constraint for the optimization problem, wherein the text markup language IR is generated by:
generating, based on the natural language text description, an objective declaration prompt that includes information about the objective for the optimization problem and a first constraint declaration prompt that includes information about the first constraint for the optimization problem;
providing the objective declaration prompt and the natural language text description to a transformer to generate the IR objective declaration; and
providing the first constraint declaration prompt and the natural language text description to the transformer to generate the first IR constraint declaration; and
generate, based on the text markup language IR, an algebraic modelling language (AML) formulation of the optimization problem, the AML formulation including an AML objective declaration that defines the objective for the optimization problem and a first AML constraint declaration that indicates the first constraint for the optimization problem.

\* \* \* \* \*